(12) United States Patent
Cromer et al.

(10) Patent No.: US 7,072,691 B2
(45) Date of Patent: *Jul. 4, 2006

(54) CRUABLE-U-NII WIRELESS RADIO WITH SECURE, INTEGRAL ANTENNA CONNECTION VIA VALIDATION REGISTERS IN U-NII WIRELESS READY DEVICE

(75) Inventors: Daryl Carvis Cromer, Apex, NC (US); Kazuo Fujii, Kanagawa (JP); Ronald John Griffiths, Jr., Raleigh, NC (US); Masaharu Itoh, Yamato (JP); Philip John Jakes, Durham, NC (US); Kozo Matsunaga, Kanagawa (JP); Masaki Oie, Machida (JP)

(73) Assignee: Lenovo (Singapore) Pte.Ltd., Singapore (SG)

( * ) Notice: Subject to any disclaimer, the term of this patent is extended or adjusted under 35 U.S.C. 154(b) by 310 days.

This patent is subject to a terminal disclaimer.

(21) Appl. No.: 10/680,977

(22) Filed: Oct. 7, 2003

(65) Prior Publication Data

US 2005/0075136 A1 Apr. 7, 2005

(51) Int. Cl.
*H04B 1/38* (2006.01)
(52) U.S. Cl. .................... 455/558; 455/552.1; 455/557
(58) Field of Classification Search ................. 455/90, 455/557, 450, 562.1, 323, 552.1, 558; 343/702; 380/270; 710/240; 713/202, 200; 726/21
See application file for complete search history.

(56) References Cited

U.S. PATENT DOCUMENTS

| 6,173,405 | B1* | 1/2001 | Nagel .......................... 726/21 |
|---|---|---|---|
| 6,404,393 | B1 | 6/2002 | Nelson et al. |
| 6,509,877 | B1 | 1/2003 | Masaki |
| 6,531,985 | B1* | 3/2003 | Jones et al. .................. 343/702 |
| 6,545,643 | B1* | 4/2003 | Sward et al. ................ 343/702 |
| 6,778,844 | B1* | 8/2004 | Hood, III ................ 455/562.1 |
| 2001/0006902 | A1 | 7/2001 | Ito |
| 2002/0087877 | A1* | 7/2002 | Grawrock .................... 713/200 |
| 2002/0137472 | A1* | 9/2002 | Quinn et al. .................. 455/90 |
| 2002/0164963 | A1 | 11/2002 | Tehrani et al. |
| 2002/0176366 | A1 | 11/2002 | Ayyagari et al. |
| 2002/0183013 | A1 | 12/2002 | Auckland et al. |
| 2003/0022652 | A1* | 1/2003 | Stepp et al. ................. 455/323 |

(Continued)

FOREIGN PATENT DOCUMENTS

EP 1 083 622 A2 3/2001

(Continued)

*Primary Examiner*—Eliseo Ramos-Feliciano
*Assistant Examiner*—Michael T. Vu
(74) *Attorney, Agent, or Firm*—Carlos Munoz-Bustamante; Dillon & Yudell LLP (57) ABSTRACT

A method that utilizes software means to meet the FCC requirement for an U-NII antenna to be an integral part of the device in which it operates, while providing wireless ready U-NII devices and CRUable U-NII radios. Enhancements are made to the system BIOS, including the inclusion of a table of PCI IDs and secret key pairs. The CRUable radio includes a pair of validation registers (VRs) and an EEPROM storing an PCI ID and secret key of an approved device. During boot up of the device, the PCI ID and secret key from the device's BIOS are compared against the PCI ID and secret key stored in the radio's EEPROM. The first comparison completes a radio-to-device authentication in the device, while the second comparison completes a device-to-radio authentication in the radio. U-NII transmission capability is enabled only when both parameters match, indicating FCC approved device-antenna-radio combination under the "integral" requirement.

26 Claims, 5 Drawing Sheets

U.S. PATENT DOCUMENTS

| | | |
|---|---|---|
| 2003/0043078 A1 | 3/2003 | Deng et al. |
| 2003/0050032 A1 | 3/2003 | Masaki |
| 2003/0070098 A1* | 4/2003 | Tokita .................. 713/202 |
| 2003/0202662 A1* | 10/2003 | McBrearty et al. ......... 380/270 |
| 2004/0053622 A1* | 3/2004 | Nakakita et al. ............ 455/450 |
| 2004/0204079 A1* | 10/2004 | Hamdi ..................... 455/557 |
| 2004/0225786 A1* | 11/2004 | Puupponen et al. ........ 710/240 |

FOREIGN PATENT DOCUMENTS

| | | |
|---|---|---|
| EP | 1 294 048 A2 | 3/2003 |

* cited by examiner

CRUABLE-U-NII WIRELESS RADIO WITH SECURE, INTEGRAL ANTENNA CONNECTION VIA VALIDATION REGISTERS IN U-NII WIRELESS READY DEVICE

RELATED APPLICATIONS

The present invention is related to the subject matter of the following commonly assigned, co-pending U.S. patent applications: Ser. No. 10/681,006 entitled "CRUABLE U-NII WIRELESS RADIO WITH SECURE, INTEGRAL ANTENNA CONNECTION VIA SM BIOS IN U-NII WIRELESS READY DEVICE"; and Ser. No. 10/680,974 entitled "CRUABLE DUAL MODE U-NII WIRELESS RADIO WITH SECURE, INTEGRAL ANTENNA CONNECTION IN U-NII WIRELESS READY DEVICE". The content of the above-referenced applications is incorporated herein by reference.

BACKGROUND OF THE INVENTION

1. Technical Field

The present invention relates generally to wireless communication devices and in particular to wireless communication devices utilized in computer systems. Still more particularly, the present invention relates to customer installable and replaceable U-NII wireless cards utilized in computer systems.

2. Description of the Related Art

The present invention relates generally to wireless communication devices and in particular to wireless communication devices utilized in computer systems. Still more particularly, the present invention relates to customer installable and replaceable U-NII wireless cards utilized in computer systems.

Computer-based wireless communication devices, including wireless LANs and wireless ready systems, is a quickly emerging and evolving technology. Conventional computer-based wireless communication devices transmit radio frequency (RF) signals to wireless receivers of local area networks (LANs). These devices include transmitters that both transmit and receive wireless communication within a particular bandwidth in the highly regulated RF spectrum.

The RF spectrum is a limited bandwidth spectrum that is allocated among a number of different services types/applications, including military, aviation, broadcast, and commercial communications. Because of the very limited bandwidth available within the radio frequency (RF) spectrum, transmission in this medium is subject to strict government regulations. The regulations typically cover to the type and parameters of the transmitters being utilized in a wireless network. These regulations cover modulation scheme, frequency of operation, and transmit power of the transmitters in order to avoid interference among the various authorized services utilizing the RF spectrum.

Transmitters comprise a combination of a circuit module called a radio coupled to an antenna. The antenna is a central part of the transmitter since the antenna is designed and tuned to optimize gain or attenuation for desired frequencies. Conventionally, manufacturers of transmitters obtain a license from the government authorizing the manufacturer to manufacture a particular type of transmitter, exhibiting particular parameters. The license covers both components of the transmitter unit (i.e., radio and antenna), and the license typically specifies exact protocols (i.e., operating parameters or ranges of parameters) for both components and the combination device. In the United States, for example, licenses are granted and regulated by the Federal Communication Commission (FCC). Also, the regulations require that the end users not be able to change or reconfigure the transmitter, which would result in operation outside of the authorized parameters. Any change made to the operating parameters radio or antenna requires another application for license and authorization by the FCC.

Conventional wireless computer networks are provided two frequency ranges with defined protocols to support wireless operations. These protocols are the 802.11b and 802.11g protocols, operating at ISM band for 2.4 GHz, and the U-NII HiperLAN/2 and other protocols, operating at U-NII for 5 GHz. With the strict government regulations, it is essential that manufacturers and users of Wireless Fidelity (WiFi) LAN components ensure that the wireless component is operating within authorized parameters (i.e., power, roll off, etc. as defined by specification) provided by the ISM band for 2.4 GHz and U-NII for 5 GHz ranges. It is also essential for the components to be designed to prevent tampering or modification by the end users, which would change the operating parameters of the transmitter.

To obtain authorization for the transmitter, manufacturers implement design and manufacturing controls to ensure that the transmitter complies with the regulatory requirements. For example, the regulation of transmitters operating with the ISM 2.4 GHz band requires a unique connection between the radio and antenna. To satisfy this requirement, the manufacturers designed a unique connector. International Business Machines Corporation, for example, selected a reverse thread connection for its low profile peripheral component interconnect (PCI) Card. That company also implemented a method referred to as BIOS Lock, which is described below to ensure compliance with the FCC's ISM 2.4 GHz band regulations.

Maintaining tight coupling between the radio and antenna in desktop personal computer or with PCMCIA cards is straightforward, since transmitters (radio and antenna) are typically packaged as a single unit within the casing of the card. However, maintaining tight coupling for devices imbedded in notebook-type computer systems is much more complicated because the antenna is integrated into the lid portion or cover (i.e., within the external plastic or composite shell covering the top portion) of the portable computer system, while the radio is typically a mPCI (mini peripheral component interconnect) card inserted into the lower portion (i.e., the base/chassis) of the portable computer system. In the portable computer environment, the transmitter is assembled by inserting the wireless PCI card into an mPCI slot and attaching the radio to the antenna via coax cable leading to the antenna imbedded in the lid portion.

Since there are a variety of suppliers of 802.11b mPCI (ISM 2.4 Ghz band) cards available on the market, the manufacturers of the notebook computer systems have to implement ways to ensure that the FCC regulations are complied with. That is, the manufacturer must design the computer system with a built in mechanism to prevent unauthorized 802.11b cards from being utilized with the antenna built in to the computer system's cover. Different manufacturers provide different methods of handling this potential problem. IBM, for example, currently implements a method referred to as BIOS (basic input/output system) Lock, which is described below.

Conventional 802.11b mPCI cards are inserted into the computer system before the computer system is powered on, and as such, BIOS Lock occurs during boot-up of the computer system. During boot, power-on self test (POST)

checks the PCI IDs of the mPCI card and compares it to authorized cards for that computer system. If the BIOS detects an unauthorized card, the BIOS will prevent boot of the system. This method allows the manufacturer to enable a system to accept several different 802.11b WiFi cards from different suppliers. This approach also enables wireless-ready systems, where the computer system is shipped with the antenna embedded in the cover and the end user is able to install one of the authorized 802.11b WiFi mPCI radio cards.

Unlike the FCC regulation of its 802.11b (ISM 2.4 GHz band) counterpart, the FCC's regulation of transmitters operating with the 802.11a (U-NII/5 GHz band) protocol requires that: "Any U-NII device that operates in the 5.15–5.25 GHz band shall use a transmitting antenna that is an integral part of the device." (FCC regulation Part 15.407d). This restrictive requirement presents a challenge for integrating U-NII wireless LAN (WLAN) devices such as an U-NII wireless card in a mobile PC, which is designed with an antenna subsystem separate from the feature card implementing specific WLAN function. The BIOS Lock method for 802.11b (ISM 2.4 GHz band) is not stringent enough and does not meet this FCC standard of "integral part of the device".

Conventional methods provided as solutions to the "integral part of the device" requirements either (1) solder (or otherwise permanently attach) antenna leads to the WLAN feature card, or (2) permanently "bury" the feature card inside the mobile PC behind tamper-proof screws or other such mechanisms. Both approaches are not ideal because of serviceability issues, manufacturability issues, and additional costs. More importantly, the permanence of the placement of the card eliminates the ability to provide U-NII-based cards as an after-market upgrade that is customer installable, as is currently possible with 802.11b cards. The Tamper Proof Screw, introduced by IBM is one hardware implementation that has received approval by the FCC for U-NII-based machines.

The PC industry has a long tradition of providing flexibility and expandability. Manufacturers, such as IBM, are extending this tradition to the wireless arena, and are now building substantially all laptops with integrated antennas. With the 802.11b (ISM 2.4 GHz standard, for example, the user can order a card at time of purchase, add wireless, or change wireless cards in the future. This functionality, particularly the adding and/or replacing of the wireless card after purchasing the computer system, has led to the generation of customer replaceable unit (CRUable) wireless devices in the 802.11b arena.

Currently, the 802.11b radio is widely deployed in corporate enterprises and in public hot spots, such as hotels, airports, etc. Recently, manufacturers have began to deploy the higher performance 802.11a (U-NII) radio in corporate infrastructures where additional performance and capacity is critical. The difference in functional characteristics and cost of the two radios (i.e., the transmitter types) results in a different market (and/or user) for computer systems designed to support one of the two types of radio. Naturally, because of the above described regulations, computer systems supporting the 802.11a (U-NII 5 GHz)standard requires the U-NII radio be built in to and shipped/sold with the computer system, while the radios for computers supporting the 802.11b standard may often be provided after-market, as a separate user-replaceable component.

Because of the differences in users, operating parameters/restrictions, and customer demands, manufacturers conventionally manufacture single-mode wireless 802.11b cards with a radio or a combo card that contains both an 802.11b radio and separate U-NII radio. The combo (U-NII & ISM) cards are installed in the computer systems connected to the antenna with tamper proof mechanisms in order to satisfy the FCC's "integral" requirement. 802.11a/b combo cards or single function U-NII radios are not sold as a separate after-market product.

The present invention recognizes the limitations with implementing U-NII-based wireless computer systems, as well as the limitation of not enabling after-market upgrades of cards. The invention further recognizes that it would be desirable to provide mechanisms that meet the "integral part of the device" requirement for the U-NII antenna connection, but still allows for serviceability and after-market replacement or addition. These and other benefits are provided by the invention described herein.

SUMMARY OF THE INVENTION

Disclosed is a method and system that utilizes combination of software and hardware to meet the FCC requirement for an U-NII antenna to be an integral part of the device in which it operates, while providing wireless ready U-NII devices and Customer Replaceable Units (CRUable ) U-NII radios. Enhancements are made to the system BIOS, including the inclusion of a table of PCI IDs and secret key pairs. The CRUable radio includes a pair of Validation Registers (VR) and an EEPROM storing a Peripheral Component Interconnect Identification (PCI ID) and secret key of an authorized device. During boot up of the device, the PCI ID and secret key from the device's BIOS are compared against the PCI ID and secret key stored in the radio's EEPROM. The first comparison completes a radio-to-device authentication in the device, while the second comparison completes a device-to-radio authentication in the radio. U-NII transmission capability is enabled only when both parameters match, indicating FCC approved device-antenna-radio combination under the "integral" requirement.

The CRUable U-NII radio is fabricated on a wireless module that also comprises an EEPROM, comparator logic, and a plurality of configuration registers, including PCI ID register, validation input register and validation output register, and an interface for connecting to the interface slot of the device. The device comprises the antenna, the interface slot, a coax connector slot and coax coupling the connector slot to the antenna, a basic input/output system (BIOS) and an EEPROM. The device's EEPROM stores an index that points to a particular entry of a table of authorized paired device/antenna PCI IDs and associated secret keys stored within the BIOS. The software-based authentication process includes both a radio-to-device authentication process and device-to-radio authentication process.

The radio-to-device authentication process occurs at the device and comprises comparing the PCI ID from the table pointed to by the index with the PCI ID stored in the EEPROM of the wireless module radio that is copied to the PCI ID register once boot up begins. When the PCI IDs match the radio-to-device authentication process is marked as successful and the secret key associated with the PCI ID in the table is sent to the wireless module and stored in the validation input register.

The device-to-radio authentication process utilizes the secret key from the table, which is stored in the validation register (VR) and compares it to the secret key stored in the EEPROM of the wireless module.

In one embodiment, the boot process is allowed to continue only when the PCI IDs match. Otherwise the boot process is terminated. In another embodiment, the boot process is allowed to proceed but the radio is disabled from operating within the device, so that the device boots without U-NII transmission capability.

Additionally, confirmation of the match of the secret keys is stored within the validation output register, which is checked for that confirmation prior to enabling an U-NII connection with said device. Requests for U-NII transmission is therefore dependent on both parts of the authentication process being successful and having that success indicated within the validation output register. The validation output register is cleared whenever a triggering condition is registered on the device. Triggering conditions include a reboot of the device, removal of the wireless module, breaking of a connection between the antenna and the radio, modification/replacement of the radio, modification/replacement of the antenna.

The invention thus allows the manufacture of both wireless-ready U-NII computer systems and approved CRUable U-NII radios by uncoupling the radio and antenna, while ensuring that the combination of system-antenna-radio would meet the FCC integral standards for antennas and transmitters operating with that protocol.

The above as well as additional objectives, features, and advantages of the present invention will become apparent in the following detailed written description, eliminating the need for tamper proof screw and unique operation and tools.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a software-implemented authentication procedure that enables a computer system designed with an embedded U-NII-standard antenna to accommodate a CRUable wireless card while fulfilling the FCC's "integral" requirements. The invention satisfies the integral requirement for devices of U-NII wireless transmitters utilizing specific authentication processes implemented by code within system software, including system BIOS, and validation registers (VRs). Specifically, the BIOS and VRs are utilized during boot up to ensure unique, FCC approved coupling of system-antenna-radio before allowing the radio to be operational within the system.

The unique coupling via software allows the radio to be sold separately and later installed into the computer system having a correct antenna, while still meeting the regulatory requirements for unique coupling. The invention thus provides a CRUable wireless card for U-NII that is authenticated during the boot process via a software-directed scheme. The CRUable card is provided with an EEPROM and several registers, including validation input and output registers that contains data utilized to complete the authentication process and ensure that only the unique coupling will enable U-NII transmission capabilities within the system. The functional use of the VRs are described in further detail below in the description of FIGS. 3A and 4. Also, the invention is described generally with reference to ISM and U-NII devices/radios; however, for illustrative purposes, several references are made to an 802.11b ISM 2 GHz device/radio and an 802.11a U-NII 5 GHz radio/device.

In the described embodiment, the software implemented scheme involves the interaction of a VR and the system BIOS to complete the authentication process. With the software-directed authentication scheme of the present invention, a computer system designed (with embedded antenna) to operate with the U-NII wireless protocol is prevented from being powered up for use without an absolute validation/authenticated of the radio and antenna combination.

Notably, as will become clear in the described embodiments, the various implementations of the invention are significantly different from BIOS Lock currently implemented for 802.11b (2.4 GHz) operation. The BIOS Lock prevents the system from booting up with un-approved radios, but does not prevent the radio from working in an un-approved system. For example, one is able to take a 802.11b radio and install it in another notebook without BIOS lock, and the radio would be functional and connected to the antenna in that chassis. However, for U-NII (5 GHz) systems, this would probably create an unauthorized or illegal configuration under FCC regulations. The present invention overcomes this potential problem since the invention ensures both that the system will only accept approved radios and that the radio will only transmit in approved systems.

Since the radio is only functional when placed in a specific chassis that contains the correct antenna, the problems/concerns that led to the strict FCC integral regulation are eliminated, without having to hardwire the antenna and radio within the system during manufacture. The antenna and radio combination when coupled together and authenticated via the method provided by the present invention meets the FCC requirement for "integral part of the device" and is thus a legally approved combination.

Figure 1A:
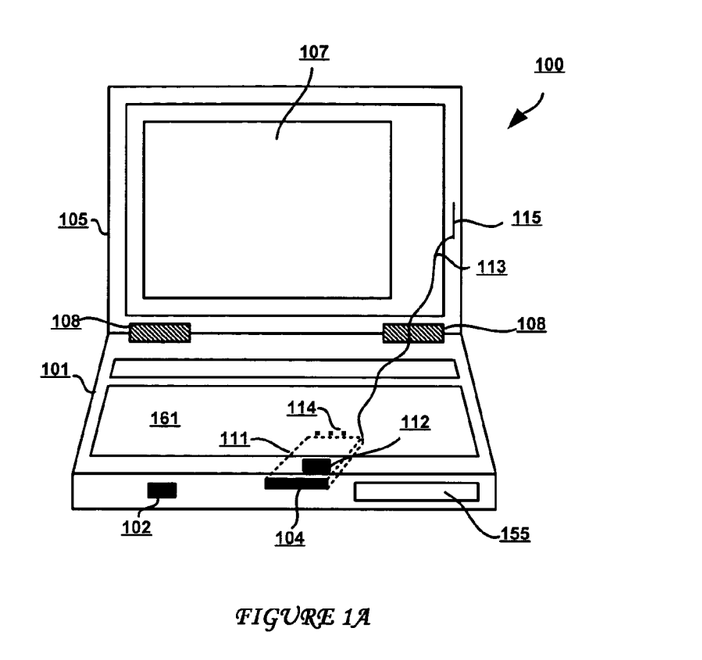
FIG. 1A is a block diagram generally illustrating the base and display portions of an exemplary laptop computer system within which the features of the invention may be implemented.
Figure 1B:
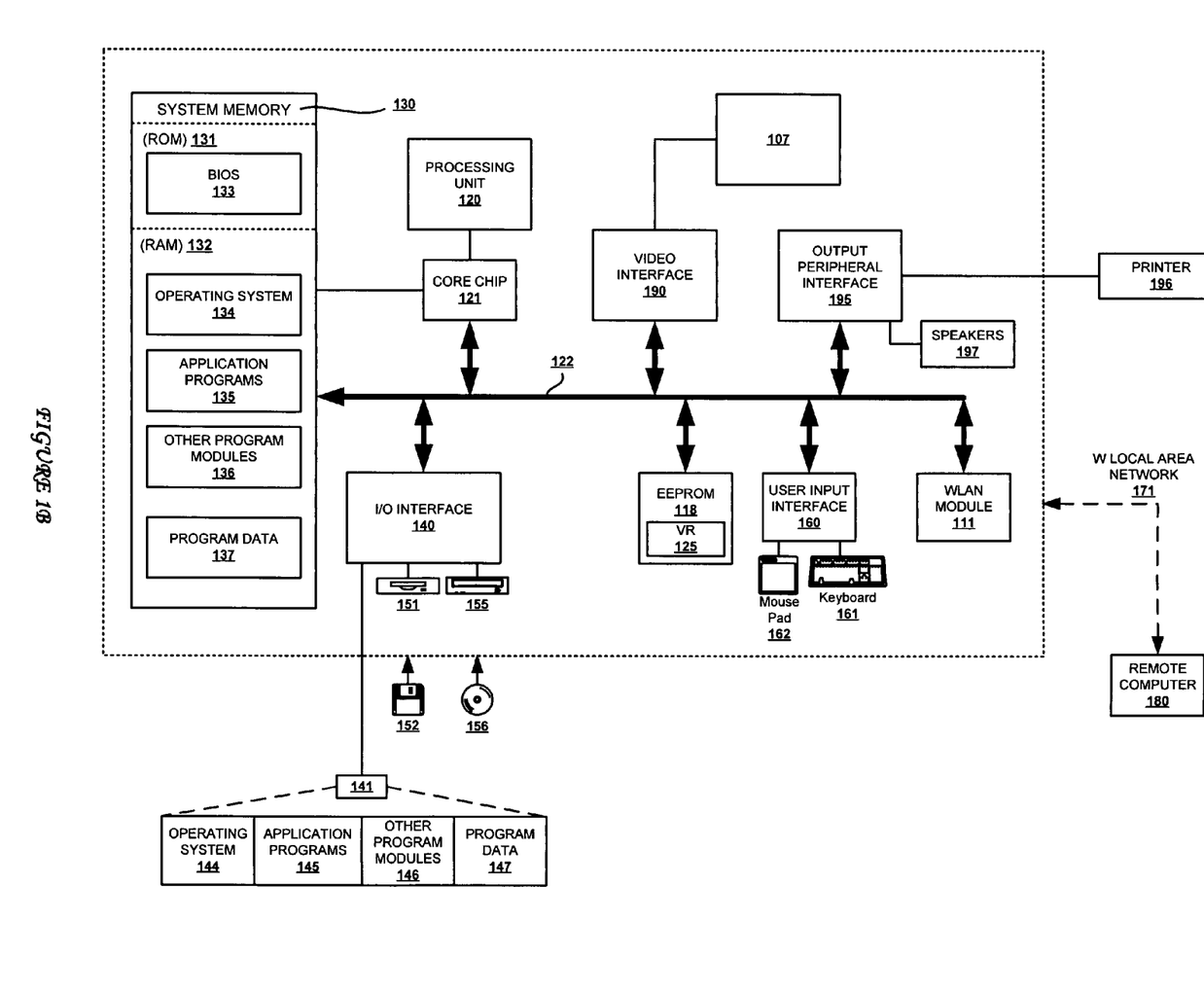
FIG. 1B is a block diagram depicting the internal components of the exemplary laptop computer of FIG. 1A, including some software components utilized in accordance with one embodiment of the invention.

Referring now to the figures, and in particular to FIGS. 1A and 1B, there are respectively illustrated an example of a wireless ready laptop computer and a computing system environment 100 within which the invention may be implemented. To simplify the description of the invention, the computing system environment is assumed to be an internal view of the laptop system described in FIG. 1A and thus share reference numerals. The laptop system and computing system environment are provided as an example and is not intended to suggest any limitation as to the scope of use or functionality of the invention. Neither should the computing environment be interpreted as having any dependency or requirement relating to any one or combination of components illustrated in the exemplary system environment.

Thus, the invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

FIG. 1A illustrates an exemplary laptop computer system configured for wireless communication (also referred to as a wireless-ready laptop computer system). Laptop computer 100 comprises base unit (or chassis) 101 having internal components and an external housing with an upper surface, a lower surface, side walls, etc. The laptop computer 100 also comprises a lid portion or cover 105 that includes display unit 107. Lid portion 105 is attached to the base unit 101 via some form of hinge mechanism 108. In the illustrative embodiment, display unit includes a screen 107 and external housing. Lid portion 105 also comprises an configured antenna 115 with an attached co-ax cable 113 running from antenna 115 through the hinge 108 into the base unit 101. The antenna 115 is hidden/embedded behind the lid cover/shell and is thus referred to as an imbedded antenna. Also, according to the invention, the antenna has a unique ID, which is known by the BIOS of the computer system. The antenna 115 may be designed to support both 2.4 GHz band and 5 GHz band operation.

Base unit 101 also comprises an on/off button 102 by which power to the internal components are turned on and off and a CD ROM (optical) drive 155 for receiving an optical recording medium. Within the base unit 101 is a mother board (not shown) on which the functional components of the laptop computer such as the processor, memory, etc., are built/installed. Also contained in the mother board is an mPCI connector (illustrated as dots 114), which accepts mPCI cards 111, such as U-NII wireless cards, 802.11b wireless cards, or 801.11a/b wireless combo cards. Access to the mPCI slot is obtained either by opening an access panel 104 (on the bottom of chassis unit 101) or by lifting keyboard 161. Although described with specific reference to mPCI cards and associated mPCI slots, those skilled in the art would appreciate that the features of the present invention may be applicable to other types of port/connection schemes and CRUable cards.

Figure 2:
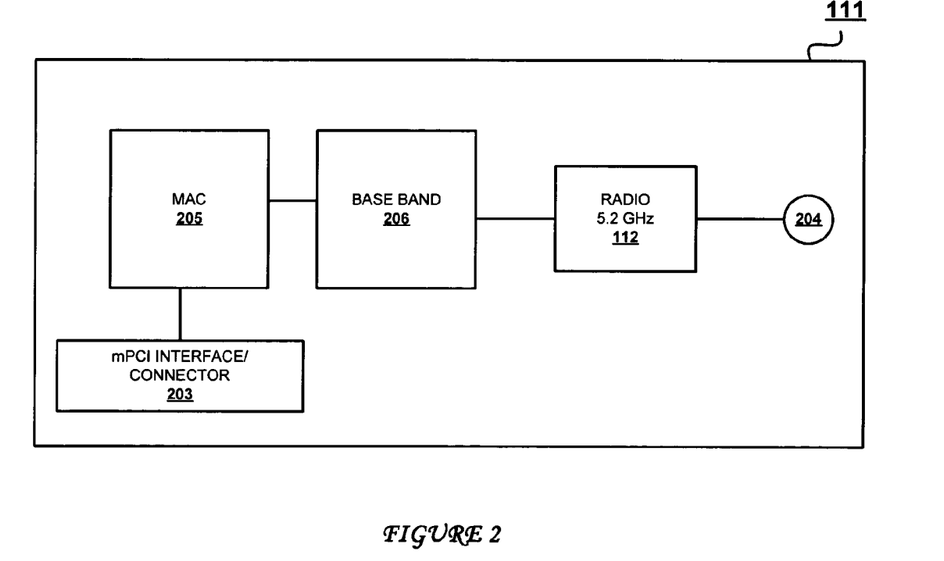
FIG. 2 depicts an exemplary CRUable wireless module with an U-NII radio according to one implementation of the present invention.

As will be explained in greater details below, an access panel 104 enables an insertion of a wireless card/module 111, such as is shown in FIG. 2, into the mPCI connector 114 located behind the access panel 104. The interfaces are electrical connectors that received interlocking connectors from the wireless card 111. Wireless card 111 has a connection interface for mPCI bus signal interface, which connects to mPCI connector 114 on the mother board. One electrical connector illustrated in FIG. 1A serves to electrically couple the radio 112 of the wireless card 111 to the antenna 115, via micro-coaxial cables 113.

Turning briefly to FIG. 2, wireless mPCI card 111 comprises wireless U-NII (5 GHz) radio 112, a BaseBand 206, and a media access controller (MAC) 205. The wireless mPCI card 111 also contains an antenna interface 204 that provides a cable connector to the radio 112 for micro-coaxial cable 113 to complete external coupling and interaction with antenna 115. As described in FIG. 1A, antenna 115 may be integrated within the lid portion of the laptop 100 and connected via micro-coaxial cable 113 to the U-NII radio 112 on mPCI card 111. mPCI card 111 also comprises an mPCI interface/connector 203 that interfaces with the processor and other components on the mother board via mPCI connector 114. Other connectors provided on mPCI include power interface (not shown) for providing mPCI card 111 with electrical power when PCI card 111 is connected within laptop 100 via mPCI connector 114. Wireless mPCI card 111 may also comprise a power regulator and preamplifier, as well as other components, none of which are relevant to the invention and therefore not illustrated herein.

With specific reference to FIG. 1B, there is illustrated an exemplary general purpose computing device, which for purposes of simplification is assumed to be wireless ready laptop computer 100. Computer 100 comprises, but is not limited to, a processing unit 120, which is connected by local bus to core chip 121. Core chip 121 is also connected to system memory 130, and a system bus 122. The system bus 122 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus.

The system memory 130 includes computer storage media in the form of volatile and/or nonvolatile memory such as read only memory (ROM) 131 and random access memory (RAM) 132. For purposes of the invention, computer 100 further comprises an EEPROM 118, connected to the system bus 122, and which contains VR 125. A basic input/output system (BIOS) 133, containing the basic routines that help to transfer information between elements within computer 100, such as during boot-up, is typically stored in ROM 131. RAM 132 typically contains data and/or program modules that are immediately accessible to and/or presently being operated on by processing unit 120. By way of example, and not limitation, the program modules include operating system (OS) 134, application programs 135, other program modules 136, and program data 137.

The computer 100 may also include other removable/non-removable, volatile/nonvolatile computer storage media. By way of example only, FIG. 1B illustrates a hard disk drive 141, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

I/O Interface 140, connects hard disk drive 141, magnetic disk drive 151, and optical disk drive 155 to the system bus 122. The drives and their associated computer storage media discussed above and illustrated in FIG. 1B provide storage of computer readable instructions, data structures, program modules and other data for the computer 100. For example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 100 through input devices such as a keyboard 161 and an integrated pointing device 162 (e.g., a track point or track pad), commonly referred to as a touch pad. These and other input devices are integrated into chassis 101 and are often connected to the processing unit 120 through a user input interface 160 that is coupled to the system bus 122, but may be connected by other interface and bus structures, such as a parallel port, game port or a universal serial bus (USB). An LCD panel 107 (integrated into lid 105) is also connected to the system bus 122 via an interface, such as a video interface 190. In addition to the monitor, computers may also include other peripheral output devices such as speakers 197 and printer 196, which may be connected through an output peripheral interface 195.

The computer 100 may operate in a networked environment using logical connections to one or more remote computers, such as a remote computer 180. The remote computer 180 may be another personal computer, a server, a router, a network PC, a peer device or other common network node, and typically includes many or all of the elements described above relative to the computer 100. When used in a WLAN networking environment, the computer 100 is connected to the WLAN 171 through a WLAN network interface or wireless adapter 111. The connection to the networked computer 180 is facilitated by WLAN module 111 which connects via wireless transmission to other components in WLAN 171. WLAN module 111 connects to system bus 122 via a mPCI connector 114. Computer 100 may also connected via wired LAN and/or the Internet via other connection modules such as a modem.

The invention operates within a communication device (e.g., the laptop computer system 100 of FIGS. 1A and 1B) with which FCC authorized radio-antenna coupling is required for U-NII communication. The computer system is provided to a user with an U-NII approved antenna embedded within the lid or other location that is made relatively in-accessible to the user or difficult to modify/replace without manufacturer authorized support. This prevents the antenna from being tampered with. Also, each embedded antenna has a unique ID, which identifies the antenna as an U-NII antenna that may be utilized to receive and issue wireless transmissions within the particular computer system. Finally, according to the invention, the particular device and antenna together provide specific identifying characteristics required by any combination of radio and antenna coupling that is to be utilized for wireless communication via the U-NII protocol.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Because most of the implementation of the invention occurs within portable computer systems, such as laptop computer system 100, the remainder of the invention will be described with specific reference to a computer system and software and hardware components thereof. As previously described, the antenna is imbedded in the system lid, which is permanently connected to the chassis, in which the mother board having the CPU and System BIOS, and mPCI slot for connecting the CRUable mPCI card is located. A permanent connection between the system lid, which contains the antenna, and the system chassis is made via the hinges. The mother board/system board has a permanent connection to the chassis and contains BIOS unique to that mother board/chassis/system and lid configuration. The permanent connections allow the combination of antenna, mother board, and BIOS to be considered a single unit. The unique paring of a wireless card (such as card 111) to the mother board allow for an integral connection which meets the FCC requirements, since the mother board has a unique coupling to antenna.

During design and manufacture of the transmission antennas, an antenna identifier (ID) is created that is unique to the specific antenna subsystem and computer system within which the antenna is to be embedded. This antenna ID is based on the antenna's size, shape, material, tuning and the size, shape, material of the surrounding composite. Further, this unique antenna ID is a function of the antenna and chassis only and not related to previously used identifiers for machine type models (i.e., CPU, segment, Series, etc).

Software-Authentication Mechanism With Validation Registers

Figure 3A:
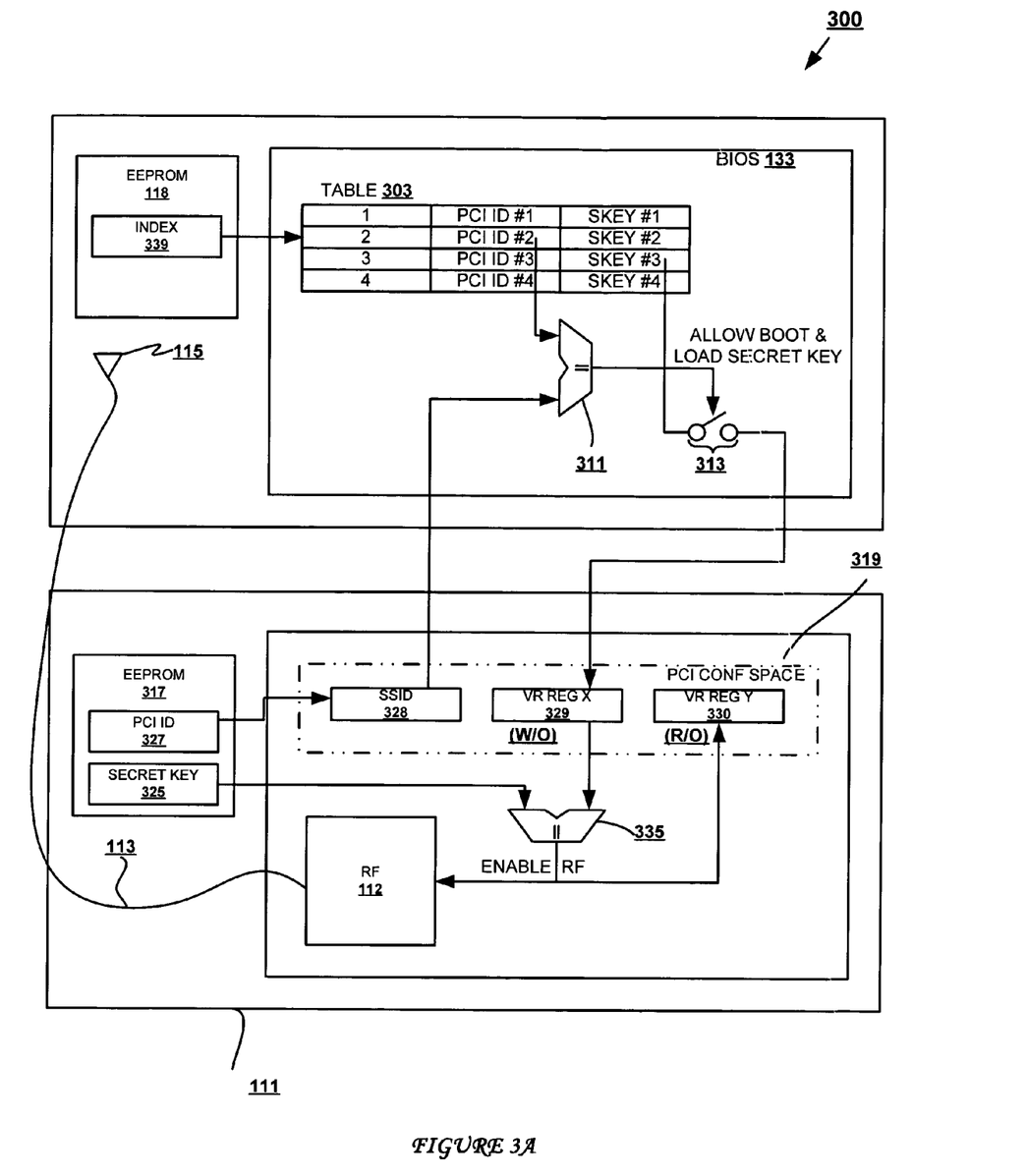
FIG. 3A depicts the system BIOS, and antenna and VR-based authentication components utilized within one embodiment of the invention.

The invention provides a two-part software-based mPCI radio authentication process, (1) a system-to-module authentication and (2) a module-to-system authentication. FIG. 3A illustrates several of the software and hardware components involved in completing the authentication process. The major blocks within the figure include blocks representing the mother board 300 of computer system 100 and a wireless module 111, shown separated by a communication line across which signals/data are sent during the authentication process. Computer system 100 comprises coax cable 113, connecting to antenna 115, EEPROM (Electrically Erasable Programmable Read-only Memory) 118 and BIOS 133. Wireless module 111 comprises a separate EEPROM 317, the U-NII radio 112 and PCI configuration space 319.

To complete the first part of the two-part authentication process (i.e., the system-to-module authentication), a table 303 is provided within the BIOS 133. The table 303 stores a list of the PCI IDs (Subsystem System IDs from PCI configuration space) of all wireless modules supported by the BIOS and associated secret key to enable only a transmitter that is unique to each module. Subsystem ID consists of vendor ID, vendor subsystem ID, device ID, and device subsystem ID.

An index 339 corresponding to the particular system is provided in the EEPROM 118 and points to the ID of one of the wireless modules identified in the table 303, which represents the antenna approved by FCC for use with the particular computer system. Other components of computer system 100 in FIG. 3A include comparator 311 and boot enable mechanism (e.g., switch) 313. Additional components in wireless module 111 includes comparator 335 and a number of registers, including PCI ID register 327 and secret key register 325 in EEPROM 317 and PCI ID register 328, validation X register 329, and validation Y register 330 in PCI configuration space 319.

Figure 3B:
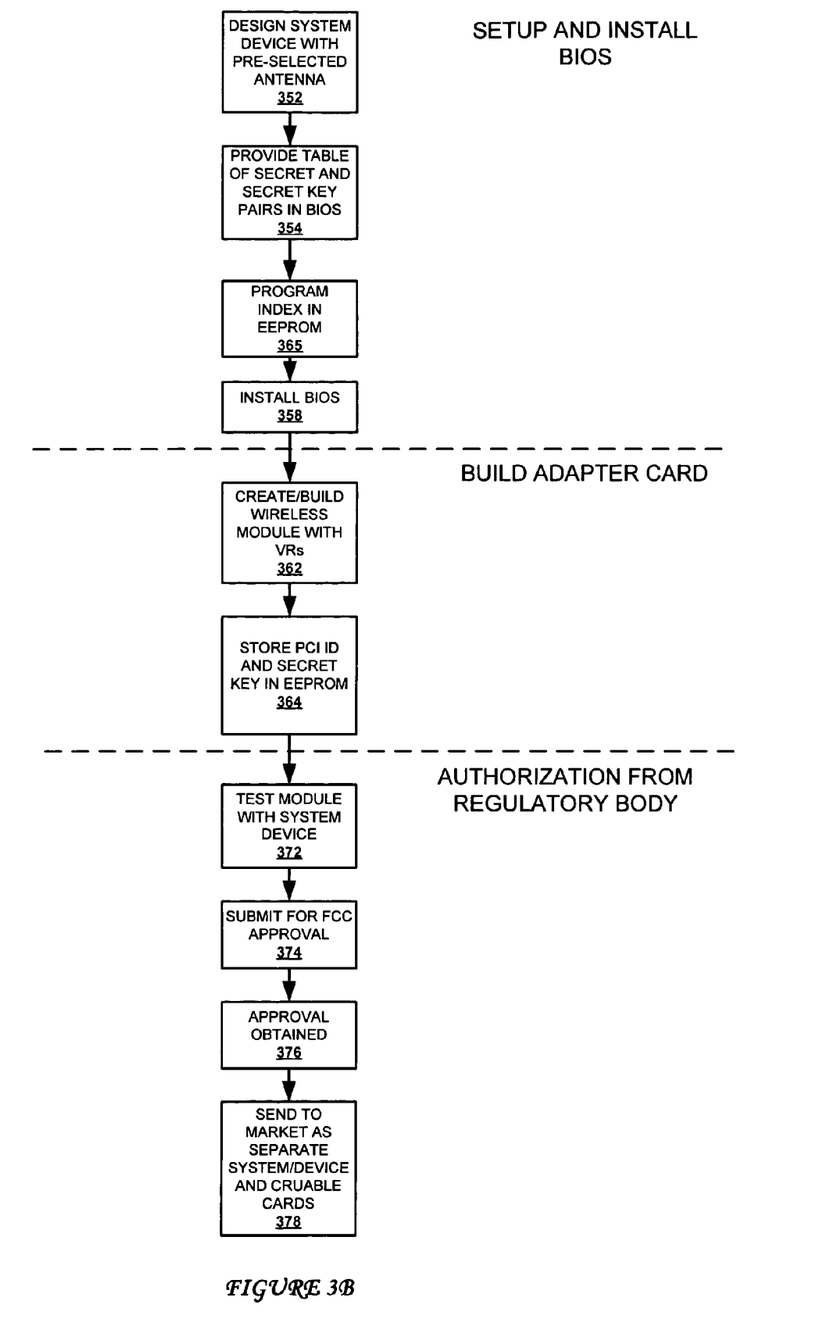
FIG. 3B is a flow chart illustrating the processes by which the device hardware and BIOS, etc. illustrated in the above figures are configured for operation according to the one embodiment of the invention.

In order to support/provide the features of the invention, the above system components and adapter card are designed and/or programmed with specific parameters and functionality. FIG. 3B provides a flow chart of the steps involved in obtaining FCC approval for the components after designing and/or programming the components with parameters and functionality required to implement the steps of the invention. The process may be divided into three stages, which are: (1) designing, configuring, and installation of the BIOS; (2) building the CRUable adapter card; and (3) obtaining authorization from the regulatory body. Although described as sequential stages, the stages may be completed in any order and at or near the same time.

The first stage begins with a manufacturer designing the system/device with a particular antenna having pre-established operating parameters as shown at block 352. The BIOS creator then provides the table of PCI IDs and corresponding secret keys within the BIOS as shown at block 354. The manufacturer/supplier determines the PCI ID and secret key pair for the installed (embedded) antenna and programs the index within the EEPROM to point to the correct PCI ID/secret key pair within the table as indicated at block 356. Following, the BIOS is installed on the system/device/machine during the building of the mother board as indicated at block 358.

Once the system/device has been designed with the BIOS programmed with the necessary functionality based on the antenna-system combination, the second stage of creating/building the wireless module is completed as shown at block 362. During the build process, logic is provided within the module to complete the authentication steps, when the module is inserted within the system/device and power is supplied to the module. Following, the manufacturer or authorized supplier configures the module with an PCI ID and secret key pair. The PCI ID/secret key pair is stored in their respective registers in the EEPROM of the module as shown at block 364. Although different types of modules may be manufactured, all modules designed for utilization with the system/device are programmed with the same PCI ID and secret key as the PCI ID/secret key pair of the system/device.

When a system/device and authorized module have been created, the combination is subjected to a series of tests as shown at block 372 to ensure the system/device complies with government regulations. Following the completion of these tests, the system/device is submitted to the regulatory body for approval as indicated at block 374, and the manufacturer waits for approval from the governing body. The cards are also tested and submitted for approval as shown at block 558. Notably, different combinations of module cards and system/devices may be also submitted for approval from the government regulatory body. Government approval is thus obtained for all combinations of card and system/device given the BIOS and VR operations. After approval is obtained(as shown at block 376), similarly configured and designed systems/devices and modules are sent to market as individual units for customer purchase as shown at block 367. The authentication process that is built into the system/device and CRUable cards is triggered whenever the two units are coupled to each other and the system/device is powered up.

The functionality and operation of each of the components of FIG. 3A within the invention is described below with reference to the process flow of FIG. 4. For simplification, only those components that are vital to an operation are indicated with a reference numeral in the following description.

Figure 4:
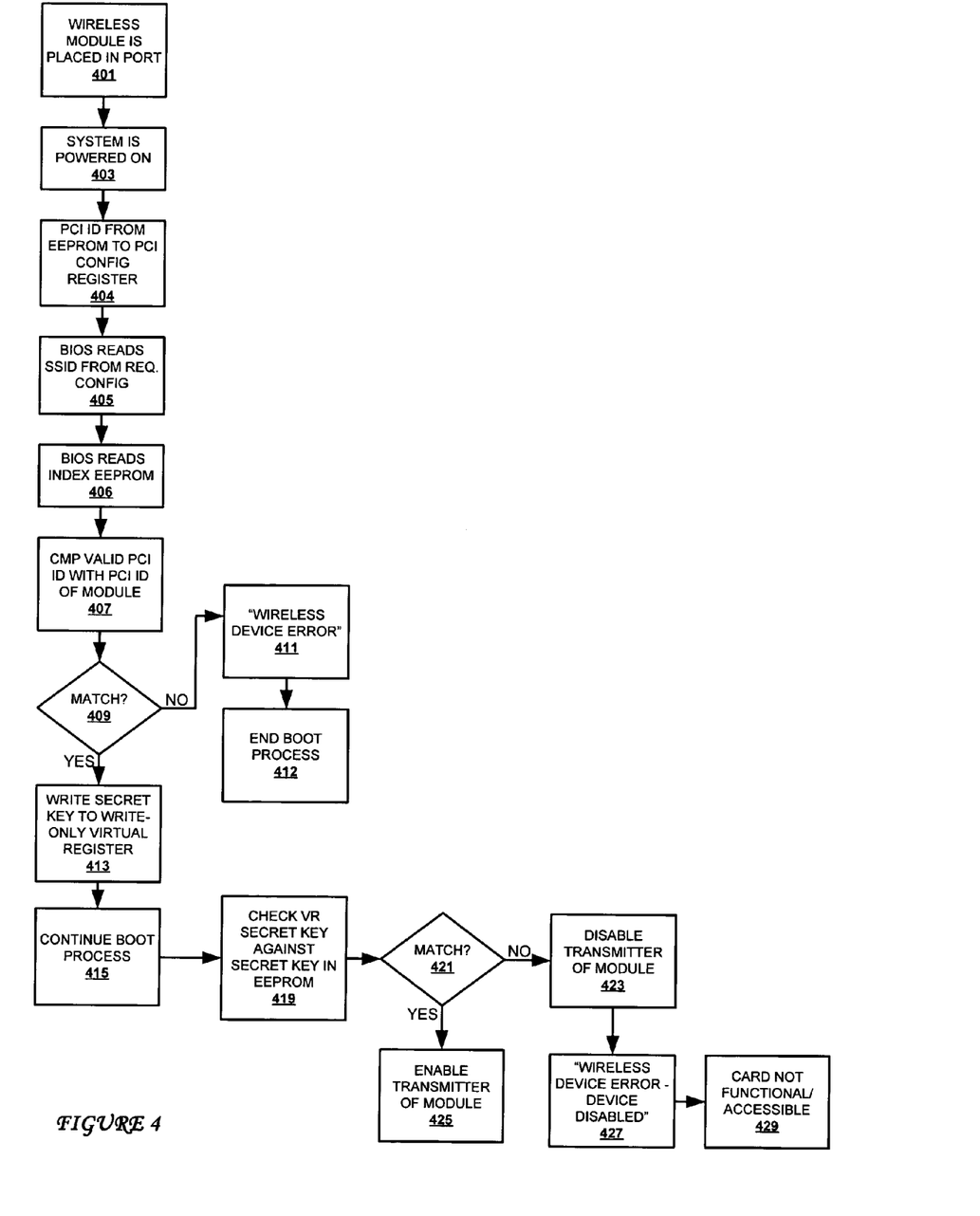
FIG. 4 is a flow chart of the process by which the VR-based authentication of an U-NII wireless module is completed in accordance with one embodiment of the invention.

FIG. 4 illustrates the process by which the software-controlled features of the present invention are completed. Before the software processing begins, the CRUable wireless module 111 is inserted in the MPCI slot of the computer system as indicated at block 401. The system is then powered-on as shown at block 403, and the power on sequence, which includes BIOS checks, etc. is initiated. Powering on the computer system also provides power to the wireless module, which initiates its own initiation or "boot-up" process. The PCI ID of the wireless module is copied from the PCI ID register 328 within PCI configuration space at block 404, and the PCI ID register is read by the BIOS as depicted at block 405. The BIOS also reads the index 339 from the system's EEPROM 118 as shown at block 406. The index value points to the PCI ID from the table 303, which identifies a valid, authorized, wireless module for the computer system 100. Then, BIOS compares the PCI ID pointed to by the index with the PCI ID (328) of the wireless module 111 as shown at block 407.

A determination is made at block 409, whether the PCI ID of the wireless module 331 inserted in the system's mPCI slot matches the valid PCI ID in the table location indicated by the index value stored within the EEPROM 118. If the PCI IDs match, the BIOS writes the secret key associated with the tabled PCI ID to the (write-only) validation register in the wireless module, as is depicted at block 413. The normal boot process is allowed to continue as indicated by block 415. When the PCI IDs do not match, the BIOS will display an error message as indicated at block 411 and the boot process is terminated as shown at block 412.

Following the above described system-to-module authentication process, the module-to-system authentication process is initiated. At this stage of the boot-up, the computer system's OS contains the PCI ID (327/328) and the secret key to enable the transmitter in the EEPROM 317 of the wireless module. The wireless module is powered on at approximately the time the system is powered on (because of a shared power configuration), and the module's processor loads the PCI ID 327 into the PCI configuration PCI ID register 328 as shown at block 404 above. The module processor compares the contents of the validation X register 329 (received during the system-to-module authentication described above) against the secret key 325 stored in the module's EEPROM 317 as indicated at block 419. A determination is made at block 421 whether the two secret keys match. When the secret keys in the validation X register 329 and the EEPROM 317 match, RF operation of the wireless module is enabled as shown at block 425. When the secret keys do not match, RF transmission is not enabled as shown at block 423, and an error is reported via another (read only) validation Y register 330. Then, either the boot process terminates as shown at block 412 or the card is made in-operable (or inaccessible) from the system as shown at block 429.

In one embodiment, the process of later determining when the radio has been authenticated involves utilization of the validation output register. An indication of the match of the secret keys is stored within said the validation output register. When a request for U-NII transmission is received on the system, the BIOS checks the validation output register for the stored (or not) indication before completing the U-NII connection from the system. Thus, a request for U-NII connection is allowed to proceed only when the indication is present in the validation output register. Also, the validation output register (and the PCI ID and validation input register) are cleared whenever a triggering condition is registered on the device. The triggering condition may be one of several conditions from among reboot of the system, removal of the wireless module, registering a break in the wired connection between the antenna and the radio, modification/replacement of the radio, and modification/replacement of said antenna, etc.

The two-path authentication mechanism ensures that the system will not complete a bootup unless an authorized combination of wireless module and antenna is doubly confirmed. An incorrect authentication in one process (e.g., system-to-module) will most probably not occur in the other authentication process (module-to system). Also, as indicated by block 429, the computer system may be allowed to boot-up but with the wireless capabilities completely disabled. Further, other built in checks of the invention may cause the computer system to automatically shut down if the user attempts to connect using an unauthorized radio (i.e., a radio that has not been authenticated by the above processes) during system operation. Additional safeguards are thus provided by the invention. The FCC's unique coupling requirement for integral transmitters is thus satisfied using software-implemented authentication of CRUable wireless modules within computer systems designed to support U-NII wireless transmissions.

Overview

Current solutions for U-NII enabled systems utilize tamper proof screws to prevent the removal of the radio by unauthorized personnel. For PCMCIA (personal computer memory card international adapter) cards, for example, the antenna is soldered to the radio and is a single unit, and this prevents un-intentional removal of the radio. The implementation and/or embodiments of the present invention enable a manufacturer to offer wireless ready systems for U-NII (5 GHz band). Further the invention allows for after-market purchase of a radio that will satisfy the FCC requirements within a particular device having the software authorization checks provided herein, thus enabling users the flexibility of deciding when to invest in the more expensive U-NII devices or upgrade their radio, etc. The invention also results in significant cost savings to the manufacturer, since the U-NII products are CRUable (i.e., customers can install, exchange, or replace the radio, rather than requiring the radio to be serviced by an authorized service center). This solution also provides a significant improvement in manufacturing, since it does not require tamper proof designs.

While the invention has been described with specific reference to portable computers and/or laptop computers, the features of the invention are not limited to such devices. Those skilled in the art appreciate that the features of the invention may be extended to any device utilizing wireless transmitters, including desktop computers that are built with embedded antennas and a slot for receiving a wireless card, and any portable electronic device with similar wireless transmission capabilities and components.

Also, it is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method comprising:
receiving a CRUable U-NII radio into an interface slot within a wireless ready device designed for receiving radio cards, said radio having a pair of identifying parameters, wherein said slot enables said radio to interface with an antenna built into the device and having a unique distinguishing characteristic;
during boot up of the device, completing an authentication process that verifies that said radio is an authorized radio for utilization with the antenna within the device under U-NII standards; and
when said authentication process verifies that said radio is authorized, completing a boot of said device and enable U-NII communication via the combination of said antenna and said radio, wherein a U-NII transmitter meeting an FCC "integral" requirement is provided within a wireless ready device having an embedded antenna, wherein U-NII communication is not enabled if said authentication process does not verify that said radio is authorized.

2. The method of claim 1, wherein:
said CRUable U-NII radio is fabricated on a wireless module that also comprises an BEPROM, comparator logic, and a plurality of configuration registers, including PCI ID register, validation input register and validation output register, and an interface for connecting to said interface slot of said device;
said device comprises the antenna, the interface slot a coax connector slot and coax coupling the connector slot to said antenna, a basic input/output system (BIOS) and an BEPROM, said BEPROM storing an index that points to a particular entry of a table of paired values stored within the BIOS, said table of paired values providing a PCI ID of the device and an associated secret key, and said step for completing a software-based authentication process comprises completing a radio-to-device authentication process and completing a device-to-radio authentication process.

3. The method of claim 2, wherein said step of completing a radio-to-device authentication process comprises:
reading a first PCI ID from the table within the BIOS, wherein said PCI ID read is stored as an entry in said table at which said index stored within the BEPROM points;
receiving a second PCI ID from the PCI ID register of wireless module, said PCI ID corresponding to an antenna/device PCI ID for which said radio is authorized comparing said first PCI ID and said second PCI ID for a match; and
when said first PCI ID and said second PCI ID matches, approving said radio-to-device authentication process as a successful authentication of said radio for operation within said device.

4. The method of claim 3, further comprising:
when said first PCI ID and said second PCI ID matches, exporting a secret key affiliated with said first PCI ID within the table to the VR of the wireless module.

5. The method of claim 3, further comprising:
when said first PCI ID and said second PCI ID matches, allowing a boot process being executed on the device to complete, wherein when said match does not occur, said boot process is terminated.

6. The method of claim 3, further comprising:
when said first PCI ID and said second PCI ID does not match, disabling said radio from operating within said device, wherein said device is booted without U-NII transmission capability.

7. The method of claim 2, wherein said step of completing device-to-radio authentication process, comprises:
reading a first secret key from the BEPROM of the wireless module;
receiving a second secret key from the device, said second secret key being temporarily stored within the validation input register;
comparing said first secret key with said second secret key for a watch; and
enabling said radio for U-NII transmission within said device when said first secret key and said second secret key matches.

8. The method of claim 7, wherein said second secret key is received within said validation input register only after an PCI ID stored in the EEPROM of the wireless module matches the PCI ID of the device/antenna, whereby a dual authentication process is completed to activate said radio for U-NII operation within the device.

9. The method of claim 7, further comprising:
when said match does not occur, disabling said radio from operating within said device, wherein said device is booted without U-NII transmission capability.

10. The method of claim 7. wherein said enabling step further comprises:
storing an indication of said match within said validation output register;
checking said validation output register for said indication prior to completing a U-NII connection with said device, wherein a request for U-NII connection is allowed to proceed only when said indication is present in said validation output register; and
clearing said validation output register whenever a triggering condition is registered on the device, said triggering condition being a condition from among rebooting the device, removing the wireless module, breaking a connection between said antenna and said radio, modification/replacement of said radio, modification/replacement of said antenna.

11. A wireless-ready device comprising:
an interface slot which receives a CRUable U-NII radio into an interface slot within said device designed for receiving radio cards, said radio having a pair of identifying parameters, wherein said slot enables said radio to interface with an antenna built into the device and having a unique distinguishing characteristic;
an authentication mechanism that completes an verification process during boot up of the device that verifies that said radio is an authorized radio for utilization with the antenna within the device under U-NII standards; and
U-NII transmitter activation logic that, when said verification process verifies that said radio is authorized, completes a boot of said device and enables U-NII communication via the combination of said antenna and said radio, wherein a U-NII transmitter meeting an FCC "integral" requirement is provided within the wireless ready device and wherein U-NII communication is not enabled if said verification process does not verify tat said radio is authorized.

12. The device of claim 11, wherein:
said CRUable U-NII radio is fabricated on a wireless module tat also comprises an BEPROM, comparator logic, and a plurality of configuration registers, including PCI ID register, validation input register and validation output register, and an interface for connecting to said interface slot of said device;
said device comprises the antenna, the interface slot, a coax connector slot and coax coupling the connector slot to said antenna, a basic input/output system (BIOS) and an EEPROM, said EEPROM storing an index tat points to a particular entry of a table of paired values stored within the BIOS, said table of paired values providing an PCI ID of the device and an associated secret key; and
said authentication mechanism provides both radio-to-device authentication and device-to-radio authentication.

13. The device of claim 12, wherein said radio-to-device authentication comprises:
reading logic for reprieving a first PCI ID from the table within the BIOS, wherein said PCI ID read is stored as an entry in said table at which said index stored within the BEPROM points;
validation input register that receives a second PCI ID from the PCI ID register of the wireless module, said PCI ID corresponding to an antenna/device PCI ID for which said radio is authorized;
a comparator that compares said first PCI ID and said second PCI ID for a match; and
verification logic that, when said first PCI ID and said second PCI ID matches, signals an approval of said radio-to-device authentication as a successful authentication of said radio for operation within said device.

14. The device of claim 13, further comprising:
issuing logic that responds to a match of said first PCI ID and said second PCI ID, by exporting a secret key affiliated with said first PCI ID within the table to the VR of the wireless module.

15. The device of claim 13, further comprising:
boot termination mechanism that allows a boot process being executed on the device to complete when said first PCI ID and said second PCI ID matches, wherein when said match does not occur, said boot termination mechanism terminates said boot process.

16. The device of claim 13, further comprising:
a transmission disabling mechanism that disables said radio from operating within said device when said first PCI ID and said second PCI ID does not match, wherein said device is booted without U-NII transmission capability.

17. The device of claim 12, wherein said device-to-radio authentication, comprises:
a comparator that compares a first secret key received from the wireless module with a second secret key from the device's BIOS for a match;
a secret key register within the EEPROM of the wireless module that stores the first secret key and forwards the first secret key to the comparator during boot-up of said device;

a switch mechanism that enables forwarding of the second secret key from the device when radio-to-device authentication is verified;

a validation input register that temporarily stores the second secret key forwarded by the switch mechanism; and transmission activation mechanism that enables said radio for U-NII transmission within said device when said comparator indicates that said first secret key and said second secret key matches.

18. The device of claim 17, wherein said second secret key is received within said validation input register only after an PCI ID stored in the EEPROM of the wireless module matches the PCI ID of the device/antenna, whereby a dual authentication process is completed to activate said radio for U-NII operation within the device.

19. The device of claim 17, further comprising a transmission disabling mechanism, including a switch, that disables said radio from operating within said device when said first PCI ID and said second PCI ID do not match, wherein said device is booted without U-NII transmission capability.

20. The device of claim 17, wherein said transmission activation mechanism further comprises:

a validation output register that stores a result of whether the first secret key matches the said second secret key;

means for checking said validation output register for said result prior to completing a U-NII connection with said device, wherein a request for U-NII connection is allowed to proceed only when said result indicates a match between said secret keys; and reset mechanism for resetting a value of said validation output register whenever a triggering condition is registered on the device, said triggering condition being a condition from among rebooting the device, removing the wireless module, breaking a connection between said antenna and said radio, modification/replacement of said radio, modification/replacement of said antenna.

21. In a device having an embedded antenna designed for supporting wireless communication via the U-NII wireless protocol, a basic input/output system (BIOS), a first BEPROM, and an interface for receiving a CRUable U-NII radio, a method for providing an approved U-NII transmitter within the device, said method comprising:

receiving at an interface slot of the device an mPCI card containing said CRUable U-NII radio into said electronic device, wherein said mPCI card comprises a second EEPROM and a plurality of PCI ID configuration registers, including PCI ID register, validation input register and validation output register;

comparing a second PCI ID obtained from the second EEPROM wit a first PCI ID associated with the approved antenna for the device and stored within the BIOS of the device;

comparing a second secret key obtained from the second EEPROM with a secret key of said first PCI ID that is also stored within the BIOS;

enabling U-NII transmission via the combination of the radio and the antenna only when both the first comparing step and the second comparing step results in a match.

22. The method of claim 21, further comprising:

initiating a boot up of the device after said receiving step, wherein said boot up activates a BIOS check of the device and the radio;

copying the first PCI ID from an EEPROM of mPCI ID card into the PCI ID register during said boot up;

reading said first PCI ID from a table of said BIOS that stores PCI ID and secret key pairs as entries, wherein said first PCI ID is identified by an index within the first BEPROM tat points to an entry of the table containing the first PCI ID; and exporting said first secret key to said validation input register only alter said first comparing step results in a match, wherein said second comparing step occurs sequentially after said first comparing step.

23. The method of claim 22, further comprising terminating said boot up when at least one of said first comparing and said second comparing steps does not result in a match.

24. The method of claim 22, further comprising disabling said mPCI card when at least one of said first comparing and said second comparing steps does not result in a match, wherein said device boots up without U-NII transmission capability.

25. The method of claim 22, wherein said enabling step further comprises:

storing an indication of said match within said validation output registers checking said validation output register for said indication prior to completing an U-NII connection with said device, wherein a request for U-NII connection is allowed to proceed only when said indication is present in said validation output register; and clearing said validation output register whenever a triggering condition is registered on the device, said triggering condition being a condition form among rebooting the device, removing the wireless module, breaking a connection between said antenna and said radio, modification/replacement of said radio, modification/replacement of said antenna.

26. The method of claim 21, wherein said device is a portable computer system.

* * * * *

UNITED STATES PATENT AND TRADEMARK OFFICE
CERTIFICATE OF CORRECTION

PATENT NO. : 7,072,691 B2  
APPLICATION NO. : 10/680977  
DATED : July 4, 2006  
INVENTOR(S) : Cromer et al.

Page 1 of 1

It is certified that error appears in the above-identified patent and that said Letters Patent is hereby corrected as shown below:

In Claim 2, at column 14, line 36, delete "BEPROM" and insert --EEPROM--.

In Claim 2, at column 14, line 44, delete "an BEPROM" and insert --an EEPROM--.

In Claim 2, at column 14, line 44, delete "said BEPROM" and insert --said EEPROM--.

In Claim 3, at column 14, line 56, delete "BEPROM" and insert --EEPROM--.

In Claim 7, at column 15, line 17, delete "BEPROM" and insert --EEPROM--.

In Claim 11, at column 16, line 6, delete "tat" and insert --that--.

In Claim 12, at column 16, line 9, delete "tat" and insert --that--.

In Claim 12, at column 16, line 9, delete "BEPROM" and insert --EEPROM--.

In Claim 12, at column 16, line 17, delete "tat" and insert --that--.

In Claim 13, at column 16, line 30, delete "BEPROM" and insert --EEPROM--.

In Claim 22, at column 18, line 17, delete "BEPROM" and insert --EEPROM--.

Signed and Sealed this

Nineteenth Day of December, 2006

JON W. DUDAS  
*Director of the United States Patent and Trademark Office*